US008052187B2

(12) United States Patent
Orr et al.

(10) Patent No.: US 8,052,187 B2
(45) Date of Patent: Nov. 8, 2011

(54) COVER INSTALLATION TOOL

(75) Inventors: Shawn G. Orr, Grand Rapids, MI (US); Michael J. Oldham, Kalamazoo, MI (US)

(73) Assignee: The Viking Corporation, Hastings, MI (US)

( * ) Notice: Subject to any disclaimer, the term of this patent is extended or adjusted under 35 U.S.C. 154(b) by 0 days.

(21) Appl. No.: 13/009,334

(22) Filed: Jan. 19, 2011

(65) Prior Publication Data

US 2011/0107584 A1 May 12, 2011

Related U.S. Application Data

(62) Division of application No. 12/111,661, filed on Apr. 29, 2008, now Pat. No. 7,891,716.

(51) Int. Cl.
*B25J 1/00* (2006.01)

(52) U.S. Cl. ........................ 294/209; 294/210; 294/99.1

(58) Field of Classification Search ................. 294/19.1, 294/19.2, 99.1; 81/53.11, 53.12; 29/270
See application file for complete search history.

(56) References Cited

U.S. PATENT DOCUMENTS 844,601 A 2/1907 Koerper
2,551,486 A 5/1951 Burden
3,900,795 A * 8/1975 Larsen et al. ................. 324/537
3,952,488 A 4/1976 Coulter
4,006,581 A 2/1977 Freeman
4,313,632 A 2/1982 King et al.
4,663,996 A 5/1987 Grudgfield et al.
4,787,632 A 11/1988 Nigrelli et al.
5,563,766 A * 10/1996 Long et al. .................... 361/600
5,809,850 A 9/1998 Tickner
6,048,014 A 4/2000 Stefanik
6,591,716 B2 7/2003 Wantz
6,644,617 B2 * 11/2003 Pitlor ............................ 248/544
6,672,636 B2 * 1/2004 Kelly ............................ 294/19.1
6,859,146 B2 * 2/2005 McGreal et al. ........... 340/693.6
7,311,345 B2 12/2007 Kerr

OTHER PUBLICATIONS

Escutcheon Tool for Recessed Automatic Sprinklers, Globe Fire Sprinkler Corporation, Bulletin ASB-ESCTL, Rev. #2 (Aug. 2002) (1 page).
Mirage Concealed Cover Installer Tool, The Viking Corporation, New sprinkler bulletin, Form No. F_112007 (Dec. 7, 2007) (1 page).

* cited by examiner

*Primary Examiner* — Dean Kramer
(74) *Attorney, Agent, or Firm* — Harness, Dickey & Pierce, P.L.C.

(57) ABSTRACT

An installation tool may include an extension member, a body portion disposed on the extension member, and a plurality of fingers flexibly protruding from the body portion. The plurality of fingers are adapted to releasably engage a cover assembly. The plurality of fingers and the body portion cooperate to retain the cover assembly in a first direction and allow disengagement of the cover assembly in a second direction.

10 Claims, 7 Drawing Sheets

COVER INSTALLATION TOOL

CROSS-REFERENCE TO RELATED APPLICATIONS

This application is a divisional of U.S. patent application Ser. No. 12/111,661, filed on Apr. 29, 2008, now U.S. Pat. No. 7,891,716, issued Feb. 22, 2011. The entire disclosure of the above application is incorporated herein by reference.

FIELD

The present disclosure relates to an installation tool and in particular to an installation tool for installing a cover for a concealed fire protection sprinkler.

BACKGROUND

The statements in this section merely provide background information related to the present disclosure and may not constitute prior art.

Fire protection sprinklers are commonly mounted to ceilings of residential and commercial buildings. Such sprinklers are often housed within an opening in the ceiling in such a manner that the sprinkler head does not protrude below the surface of the ceiling when not in use. A decorative cover plate may be installed over the opening in the ceiling to conceal the sprinkler, improving the aesthetic qualities of the sprinkler system. In response to heat, the solder holding the cover in place melts and the cover falls away from the sprinkler and the sprinkler trigger mechanism is then activated by the heat to release a plug device to allow the sprinkler to discharge water below the ceiling.

Typically, a worker must stand atop a ladder or scaffolding to reach the opening in the ceiling to install the cover plate. When installing cover plates over multiple sprinklers, the worker must then climb down from the ladder or scaffolding, move the ladder or scaffolding below the next sprinkler, and climb back up to install the next cover, repeating this process for each of the sprinklers in a given building. This process is time-consuming and costly.

SUMMARY

An installation tool may include an extension member, a body portion disposed on the extension member, and a plurality of fingers flexibly protruding from the body portion. The plurality of fingers may be adapted to releasably engage a cover assembly. The plurality of fingers and the body portion cooperate to retain the cover assembly in a first direction and allow disengagement of the cover assembly in a second direction.

A method for installing a cover assembly onto a sprinkler assembly may include pressing a first portion of the cover assembly into releasable engagement with an installation tool having an extension member, applying a force to the extension member in a first direction along a longitudinal axis of the extension member to remotely press a second portion of the cover assembly into engagement with the sprinkler assembly, and applying a force to the extension member in a second direction along the longitudinal axis of the extension member to disengage the cover assembly from the installation tool, the cover assembly maintaining engagement with the sprinkler assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
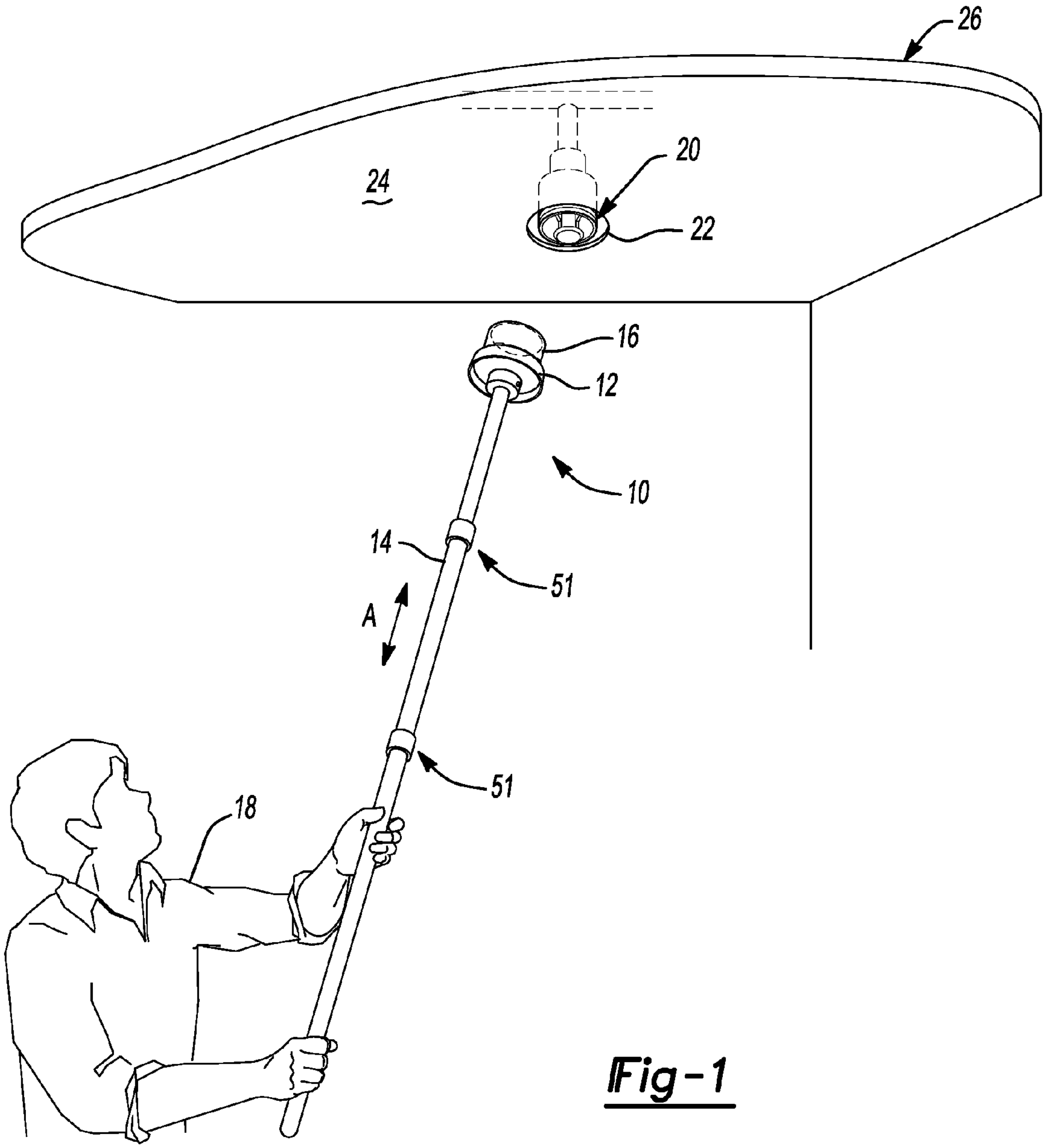
FIG. 1 is a partial perspective view of an operator installing a cover assembly onto a sprinkler assembly according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIGS. 1-10, an installation tool 10 is provided and includes a body portion 12 and an extension member 14. The installation tool 10 may releasably engage a sprinkler cover assembly 16 and extend the reach of an operator 18, allowing the operator 18 to install the cover assembly 16 onto a sprinkler assembly 20. The sprinkler assembly 20 may be installed above an opening 22 in a ceiling 24 of a building 26, for example. It should be appreciated that the sprinkler assembly 20 may be installed in a sidewall of the building 26, or any other location suited for an intended use of the sprinkler assembly 20.

Figure 2:
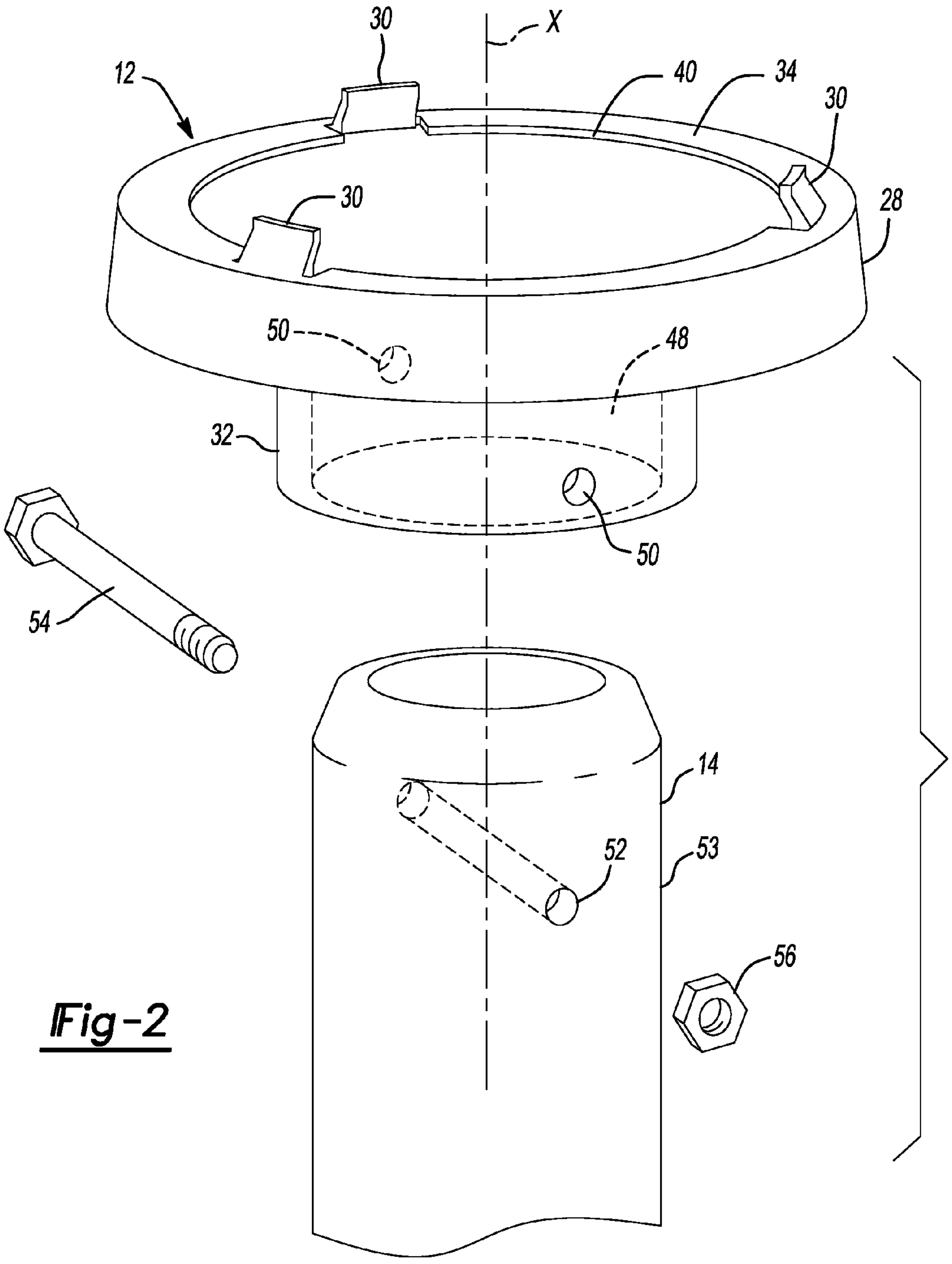
FIG. 2 is a partial exploded view of the installation tool of FIG. 1.

With reference to FIG. 2, the body portion 12 may include a head portion 28, a plurality of fingers 30, and a neck portion 32. The head portion 28, the plurality of fingers 30, and the neck portion 32 may be integrally formed, glued, fastened, welded, or otherwise suitably joined together. The body portion 12 may be formed from a polymer, metal, wood, or other suitable material known in the art or combinations thereof.

Figure 3:
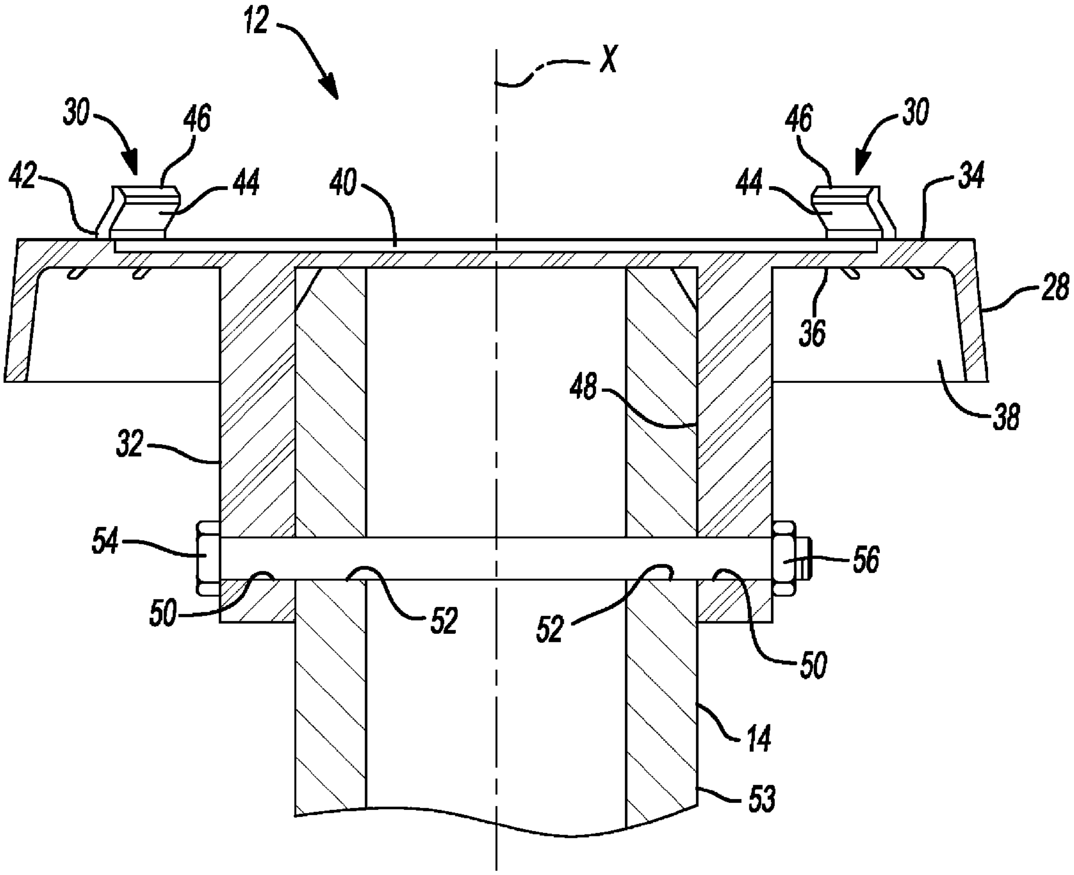
FIG. 3 is a partial cross-sectional view of the installation tool of FIG. 1.

The head portion 28 may be substantially cylindrical, and may include a front face 34 and a back face 36 disposed in a cavity 38 (FIG. 3). It should be appreciated that the head portion 28 could include a solid cross-section and could be frusto-conical, a polygonal prism, or any other suitable shape.

The front face 34 may include a generally cylindrical recess 40. The plurality of fingers 30 may protrude from the front face 34 and/or the recess 40, and may be generally angled inward towards a longitudinal axis X of the installation tool 10. The fingers 30 may be resiliently flexible and generally rectangular or any other suitable shape. The plurality of fingers 30 may be disposed in a circular pattern and each finger 30 may be equidistantly spaced relative to each other and the longitudinal axis X.

Each finger 30 may include a stem 42, a leg portion 44 and a lip portion 46 (FIGS. 7-10). The lip portion 46 may protrude from the leg portion 44 at an outward angle, away from the longitudinal axis X. It should be appreciated that the body portion 12 could include a single, continuous finger 30 protruding from the front face 34 and/or the circular recess 40 and extending 360 degrees about the longitudinal axis X, or any number of separately formed fingers.

The neck portion 32 may be generally cylindrical and may protrude from the back face 36 of the head portion 28 along the longitudinal axis X (FIG. 3). The neck portion 32 may include a cavity 48 and an aperture 50 disposed through the neck portion 32 and the cavity 48.

The extension member 14 may be an elongated rigid pole extending along the longitudinal axis X and may include an aperture 52 extending through a diameter 53 of the extension member 14 generally perpendicular to the longitudinal axis X. The extension member 14 may include one or more telescoping features 51, whereby the length of the extension member 14 may be expanded and/or contracted in the longitudinal direction as illustrated by arrow A in FIG. 1, to allow use with ceilings of various heights.

The extension member 14 may be received within the cavity 48 of the body portion 12, such that the apertures 50, 52 are disposed substantially concentric to each other. In this configuration, a fastener 54 may be disposed through the apertures 50, 52, retaining the extension member 14 within the cavity 48. The fastener 54 may be slidably engaged with the apertures 50, 52 and may threadably engage a nut 56, for example, to retain the fastener 54 therein (FIG. 3). Additionally or alternatively, the fastener 54 may be threadably engaged with the aperture 50 or glued, press fit, or otherwise fixed therein. The body portion 12 can also be permanently fixed to the extension member 14.

Figure 4:
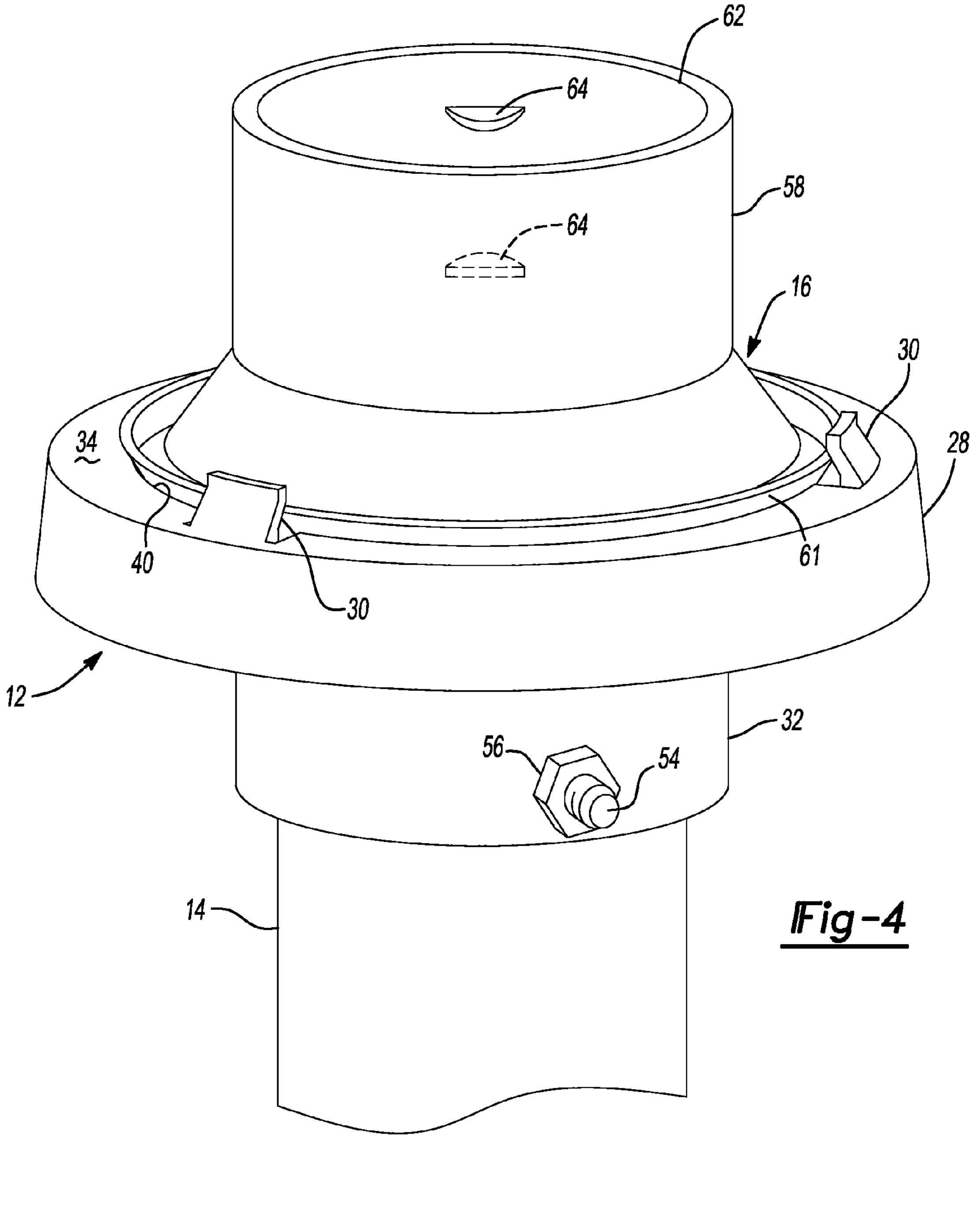
FIG. 4 is a partial perspective view of the installation tool engaging a cover assembly according to the principles of the present disclosure.
Figure 6:
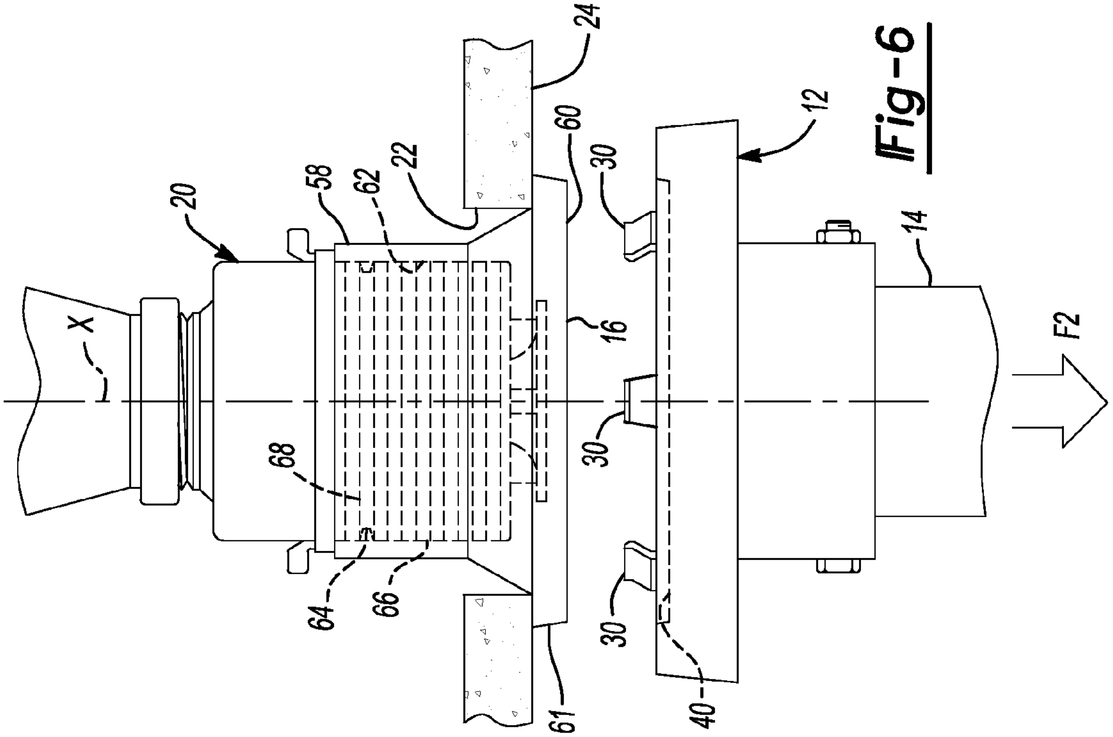
FIG. 6 is a partial side view of the cover assembly installed onto the sprinkler assembly and disengaged from the installation tool.
Figure 5:
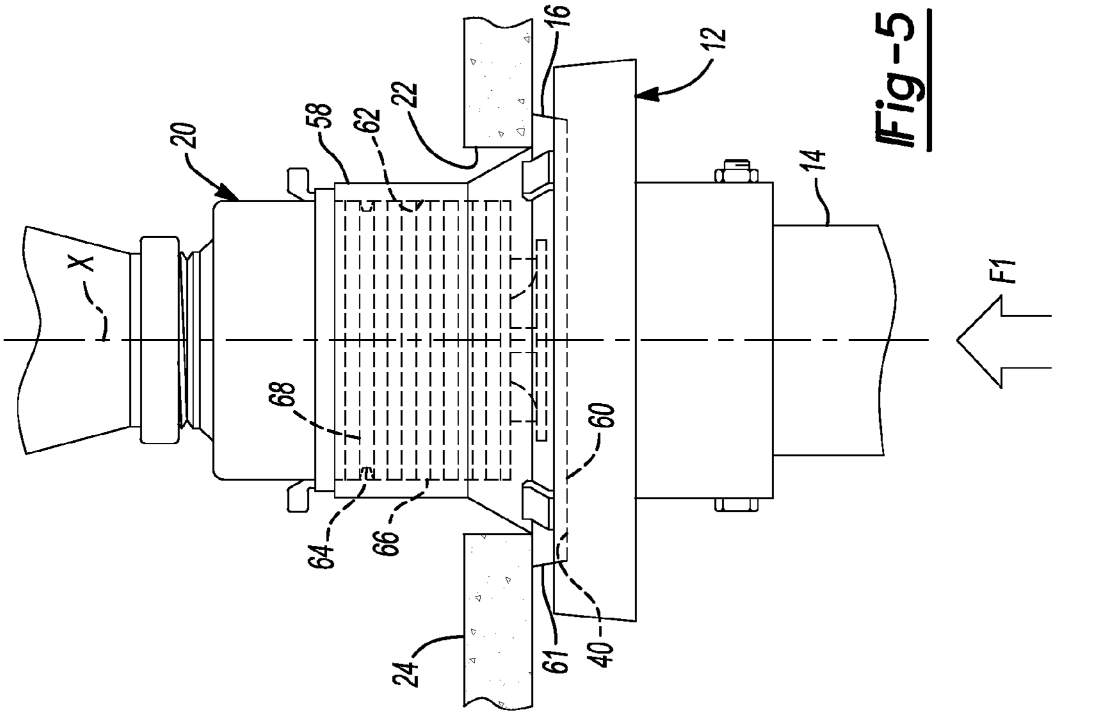
FIG. 5 is a partial side view of the installation tool pressing the cover assembly onto the sprinkler assembly according to the principles of the present disclosure.

With reference to FIGS. 4-6, the cover assembly 16 may engage the sprinkler assembly 20 and cover the opening 22 in the ceiling 24. The cover assembly 16 may include a hollow sleeve portion 58 and a cover plate 60 having an outer rim 61. The cover plate 60 is attached to the sleeve portion 58 by a heat sensitive solder that releases the cover plate 60 at a predetermined temperature. An inner diameter 62 of the sleeve portion 58 may include one or more protuberances 64. The sprinkler assembly 20 may include a neck portion 66. One or more thread-like ribs 68 may be disposed around the neck portion 66. The sleeve portion 58 may slide over the neck portion 66. The protuberances 64 may be pressed into releasable engagement with the one or more ribs 68.

With reference to FIGS. 1-10, operation of the installation tool 10 will be described in detail. The installation tool 10 may engage the cover plate 60 and extend the reach of the operator 18, enabling the operator 18 to install the cover assembly 16 onto the sprinkler assembly 20 without a ladder, scaffolding, or the like.

Figure 7:
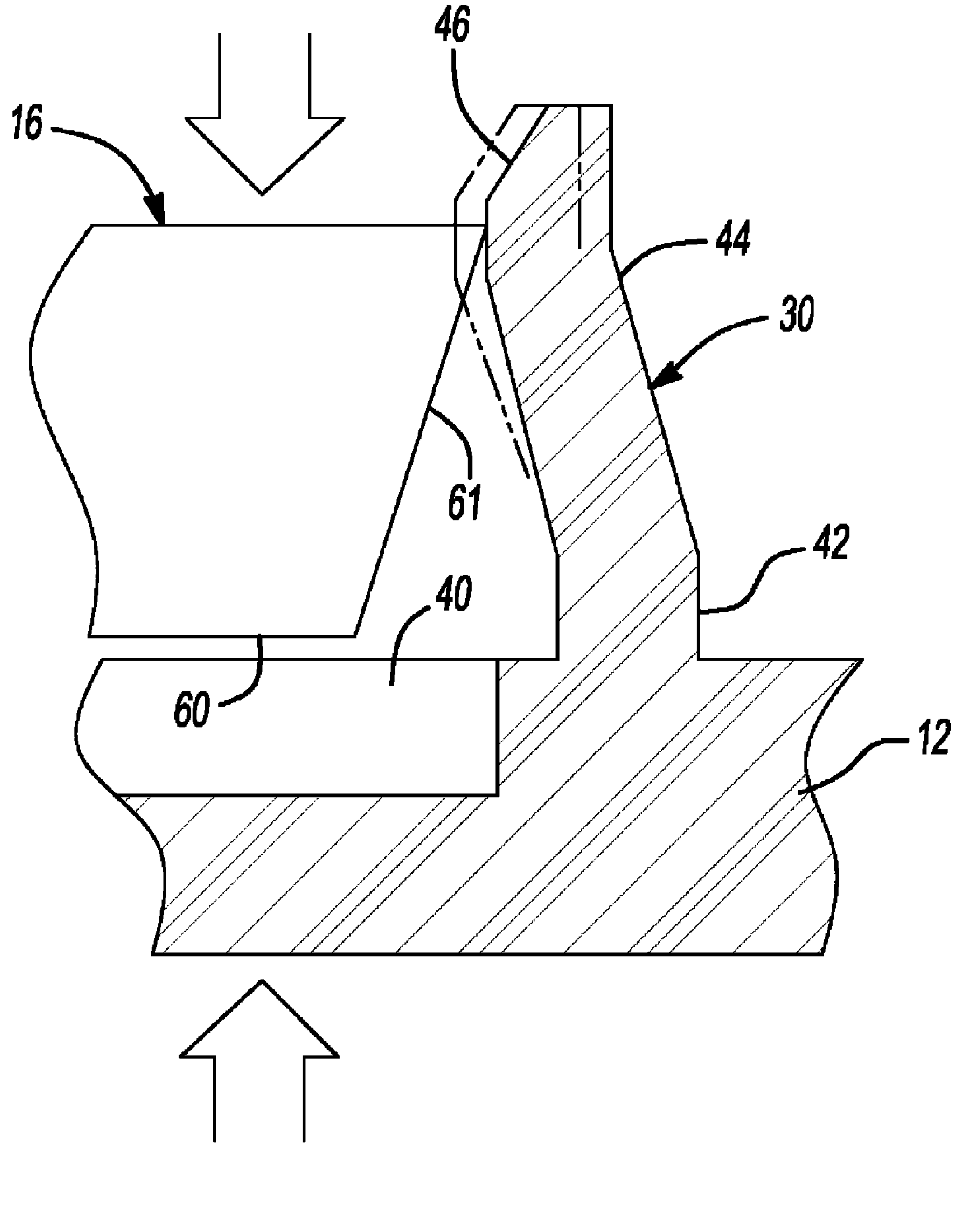
FIG. 7 is a partial cross-sectional view of a finger of the installation tool flexing to engage the cover assembly according to the principles of the present disclosure.
Figure 10:
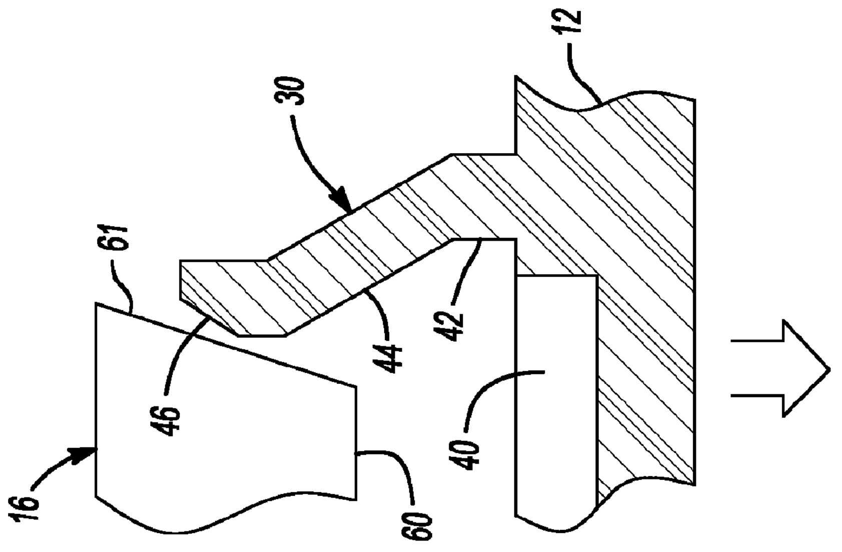
FIG. 10 is a partial cross-sectional view of the cover assembly fully disengaged from the finger according to the principles of the present disclosure.
Figure 9:
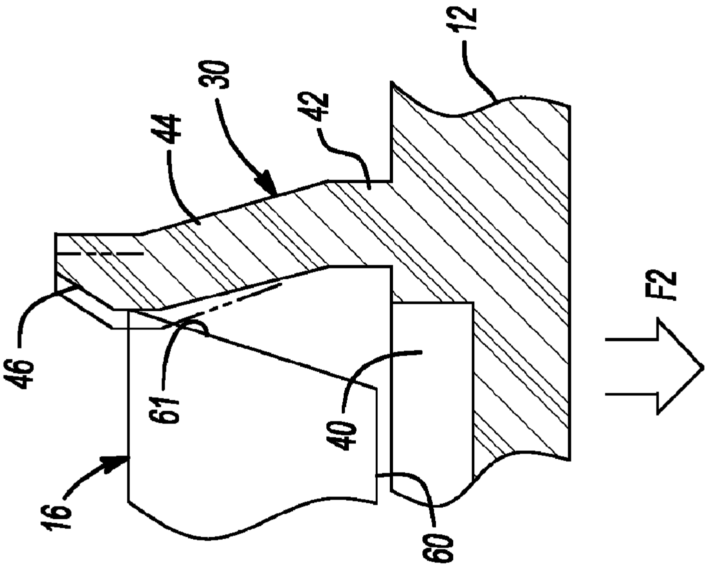
FIG. 9 is a partial cross-sectional view of the finger flexing to disengage the cover assembly according to the principles of the present disclosure.
Figure 8:
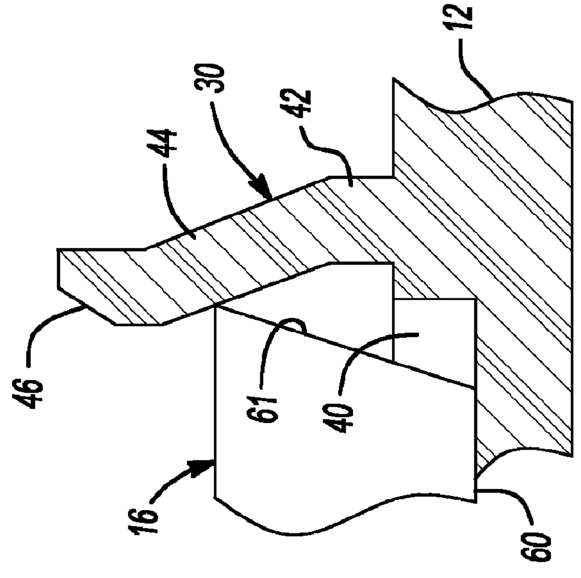
FIG. 8 is a partial cross-sectional view of the cover assembly fully engaged with the finger and a body portion of the installation tool according to the principles of the present disclosure.

The cover assembly 16 may be inserted into engagement with the fingers 30 by forcing the outer rim 61 against the lip portion 46, thereby causing the fingers 30 to flex outward to receive the cover assembly 16 (FIGS. 7 and 8). The generally inwardly angled fingers 30 allow the installation tool 10 to releasably engage different covers with a range of diameters.

In the fully engaged configuration (FIGS. 4, 5, and 8), the fingers 30 and the recess 40 may cooperate to releasably engage the outer rim 61 of the cover assembly 16, whereby the cover plate 60 may be seated in the recess 40 and the fingers 30 may be biased against the outer rim 56.

As shown in FIG. 1, the operator 18 may grasp the extension member 14 and raise the body portion 12 (with the cover assembly 16 releasably retained thereon) towards the sprinkler assembly 20 in the ceiling 24. An upward force F1 may be applied to the extension member 14 along the longitudinal axis X (FIG. 5) to remotely press the sleeve 58 of the cover assembly 16 onto the neck portion 66 of the sprinkler assembly 20. The force F1 may be sufficient to press the protuberances 64 into engagement with the one or more ribs 68, placing the cover assembly 16 in an installed position (FIG. 5). A force can then be applied to the extension member in a rotary direction to remotely adjust the cover assembly into contact with the ceiling surface by threading the cover assembly further onto the neck portion 66.

Once the cover assembly 16 is pressed into engagement with the sprinkler assembly 20, a downward force F2 may be applied to the extension member 14 along the longitudinal axis X to release the cover assembly 16 from engagement with the plurality of fingers 30 (FIG. 6). It should be noted that the length of the fingers 30 can be chosen to prevent interference with the ceiling 24.

As the downward force F2 is applied to the extension member 14, the biasing force of the fingers 30 against the outer rim 61 of the cover assembly 16 may be insufficient to retain the cover assembly 16 due to an engagement force between the protuberances 64 of the cover assembly 16 and the one or more ribs 68 of the sprinkler assembly 20. Accordingly, the cover assembly 16 may be retained in the installed position (FIGS. 5 and 6), as the installation tool 10 moves downward in response to the downward force F2, causing the fingers 30 to resiliently flex outward about the stems 42 to release the cover assembly 16 (FIGS. 8-10), whereby the cover assembly 16 may maintain installed engagement with the sprinkler assembly 20.

The description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method for installing a cover assembly onto a sprinkler assembly, said cover assembly including a cover plate having a forward face with an outer rim and a rearward facing edge at said outer rim, said method comprising:

inserting a first portion of said cover assembly into releasable engagement with an installation tool having an extension member, said installation tool engaging said forward face and said rearward facing edge of said cover plate;

applying a force to said extension member in a first direction along a longitudinal axis of said extension member to remotely press a second portion of said cover assembly into engagement with said sprinkler assembly; and applying a force to said extension member in a second direction along said longitudinal axis of said extension member to disengage said cover assembly from said installation tool, said cover assembly maintaining engagement with said sprinkler assembly.

2. The method for installing a cover assembly onto a sprinkler assembly according to claim 1, wherein said sprinkler assembly is disposed within an opening in a ceiling and said cover plate is installed with said rearward facing edge flush with a surface of said ceiling.

3. The method for installing a sprinkler cover assembly onto a sprinkler assembly according to claim 1, wherein said first portion of said cover assembly is releasably engaged with a plurality of fingers protruding from a body portion of said installation tool.

4. The method for installing a cover assembly onto a sprinkler assembly according to claim 3, wherein said plurality of fingers are biasingly disposed against a periphery of said cover assembly.

5. The method for installing a cover assembly onto a sprinkler assembly according to claim 3, wherein at least one of said plurality of fingers resiliently flexes to allow said cover assembly to disengage from said installation tool.

6. The method for installing a cover assembly onto a sprinkler assembly according to claim 3, wherein said plurality of fingers protrude from said body portion at a generally inward angle.

7. The method for installing a cover assembly onto a sprinkler assembly according to claim 1, wherein an engagement force between said cover assembly and said sprinkler assembly is greater than an engagement force between said cover assembly and said installation tool.

8. The method for installing a cover assembly onto a sprinkler assembly according to claim 1, wherein said installation tool is disposed on said extension member.

9. The method for installing a cover assembly onto a sprinkler assembly according to claim 1, wherein said extension member is expandable.

10. The method for installing a sprinkler cover assembly onto a sprinkler assembly according to claim 1, further comprising applying a force to said extension member in a rotary direction to remotely adjust said cover assembly into contact with a ceiling surface.

* * * * *